United States Patent
Wernsmann et al.

(10) Patent No.: US 7,600,362 B2
(45) Date of Patent: Oct. 13, 2009

(54) INCLINED CONVEYOR OF AN AGRICULTURAL HARVESTING MACHINE

(75) Inventors: Thomas Wernsmann, Harsewinkel (DE); Thomas Bueddefeld, Bad Wildungen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/188,547

(22) Filed: Jul. 25, 2005

(65) Prior Publication Data
US 2006/0016165 A1   Jan. 26, 2006

(30) Foreign Application Priority Data
Jul. 26, 2004   (DE) .................. 10 2004 036 183

(51) Int. Cl.
*A01D 61/00*   (2006.01)
(52) U.S. Cl. .................................. 56/16.6; 56/14.5
(58) Field of Classification Search ............... 56/9, 56/14.3, 14.4, 14.5, 16.1, 16.6, 161, 162, 56/181, 851, 185, 59, 66, 69, 75, 78, 82, 56/88, 93, 98, 106, 108, 111, 182, 183, 184; 100/151, 152, 118; 198/727, 813
See application file for complete search history.

(56) References Cited

U.S. PATENT DOCUMENTS

| | | | | |
|---|---|---|---|---|
| 2,696,290 | A * | 12/1954 | Carroll | 198/720 |
| 3,324,637 | A * | 6/1967 | Windsor et. al. | 56/15.6 |
| 4,496,429 | A * | 1/1985 | Salminen et al. | 162/358.4 |
| 5,899,051 | A * | 5/1999 | Ahle | 56/14.5 |
| 6,116,008 | A * | 9/2000 | Digman et al. | 56/15.8 |
| 6,226,967 | B1 * | 5/2001 | Staiger | 56/14.5 |
| 6,330,782 | B1 * | 12/2001 | Digman et al. | 56/15.8 |
| 6,516,941 | B1 * | 2/2003 | Buhne | 198/813 |
| 6,929,574 | B2 * | 8/2005 | Laufenberg et al. | 474/70 |
| 6,945,023 | B2 * | 9/2005 | Vandewalle et al. | 56/344 |
| 7,052,423 | B2 * | 5/2006 | Jonckheere et al. | 474/148 |
| 2003/0015405 | A1 * | 1/2003 | Buhne | 198/813 |
| 2003/0110748 | A1 * | 6/2003 | Coers et al. | 56/10.2 G |

\* cited by examiner

*Primary Examiner*—Thomas B Will
*Assistant Examiner*—Jamie L McGowan
(74) *Attorney, Agent, or Firm*—Michael J. Striker

(57) ABSTRACT

An inclined conveyor of an agricultural harvesting machine has at least one endless pulling element, at least one pulling-means guide operative for redirecting of the at least one endless pulling element and being pivotable, at least one tensioning device for tensioning the at least one pulling element, the tensioning device generating a return torque that acts on the at least one pulling-means guide.

12 Claims, 3 Drawing Sheets

INCLINED CONVEYOR OF AN AGRICULTURAL HARVESTING MACHINE

BACKGROUND OF THE INVENTION

The present invention relates to an inclined conveyor of an agricultural harvesting machine.

An inclined conveyor of a combine harvester is made known in U.S. Pat. No. 2,696,290, with which a return shaft located in a housing is rotatably supported at its outer ends on two pivoting swing arms. Each of the two swing arms is rotatably connected with a tensioning spindle of a conveyor chain tensioning device, with which the pulling means of the inclined conveyor is tensioned. As the stream of harvested crops increases, the return shaft shifts upward, which is enabled via pivoting of the swing arms.

The disadvantage of the known inclined conveyor is that the return shaft presses against the stream of harvested crops only with its natural weight, and this natural weight is not sufficient to compress the stream of harvested crops and reliably convey it to the rear region of the inclined conveyor.

SUMMARY OF THE INVENTION

The present invention is therefore based on the object of creating an inclined conveyor that avoids the disadvantages of the related art, and with which the redirecting roller compresses the stream of harvested crops and reliably conveys it to the rear region of the inclined conveyor.

In keeping with these objects and with others which will become apparent hereinafter, one feature of the present invention resides, briefly stated, in an inclined conveyor of an agricultural harvesting machine, comprising at least one endless pulling means; at least one pulling-means guide operative for redirecting of said at least one endless pulling means and being pivotable; at least one tensioning device for tensioning said at least one endless pulling means, said tensioning device generating a return torque that acts on said at least one pulling-means guide.

Due to the fact that the tensioning device also produces return torque that acts on the at least one pulling-means guide, it is ensured in a structurally simple manner that the tensioning device tensions the pulling means and presses the pulling-means guide against the harvested crops. The pulling-means guide advantageously includes a return shaft and at least one swing arm, whereby the swing arm is pivotably supported, thereby enabling the redirecting shaft to shift upward as the amount of harvested crops increases.

In an advantageous further development of the present invention, the return torque presses the pulling-means guide in a lower position against a lower stop, thereby tensioning the pulling means while the return shaft simultaneously presses against the layer of harvested crops with a surface pressure.

To compress the harvested crops conveyed on the bottom of the housing, in an advantageous further development of the present invention, the return torque pushes the pulling-means guide in a top position against the harvested crops, which lifts the return shaft.

Advantageously, the return torque increases as the vertical orientation of the swing arm increases, to counteract the increasing stream of harvested crops and the resultant increasing force of the stream of harvested crops exerted on the return shaft.

To enable the swing arm to be pivoted and shifted, in a further advantageous embodiment of the present invention, the inclined conveyor includes a housing with side walls, and the swing arm is provided with a guide bolt that is guided in a slot in a side wall.

In a particularly advantageous embodiment of the inclined conveyor according to the present invention, the swing arm is rotatably connected with the tensioning device at a pivot point located above the guide bolt at a distance from the guide bolt, so that the tensioning device simultaneously tensions the pulling means and presses the swing arm downward.

In an advantageous further development of the present invention, the tensioning device is located at least partially in the interior of the draw-in housing, to optimize the force gradient between the swing arm and the tensioning device at the pivot point.

Advantageously, the side wall includes an opening in the region of the tensioning device, via which the tensioning device can be adjusted, so that the tensioning device is easily accessible from the outside and a wear-induced elongation of the pulling means is easy to detect.

To prevent the pulling means from being tightened excessively or to prevent the tensioning element from becoming loose due to wear, a marking is provided in an advantageous further development of the present invention at the opening that indicates the length to which the compression spring should be preloaded.

In a further advantageous embodiment of the present invention, the motion of the swing arm is limited by an upper stop to prevent the coils of the compression spring from touching each other when the compression spring is compressed by the upwardly-rotating swing arm.

Due to the fact that the lower stop of the swing arm is adjustable from the outside, by way of which the lower position of the return shaft is adjustable, the smallest possible section of passage between the return shaft and the bottom of the housing can be set.

Further advantageous embodiments are the subject of further subclaims and will be described with reference to an exemplary embodiment shown in the drawings.

DESCRIPTION OF THE PREFERRED EMBODIMENTS

Figure 1:
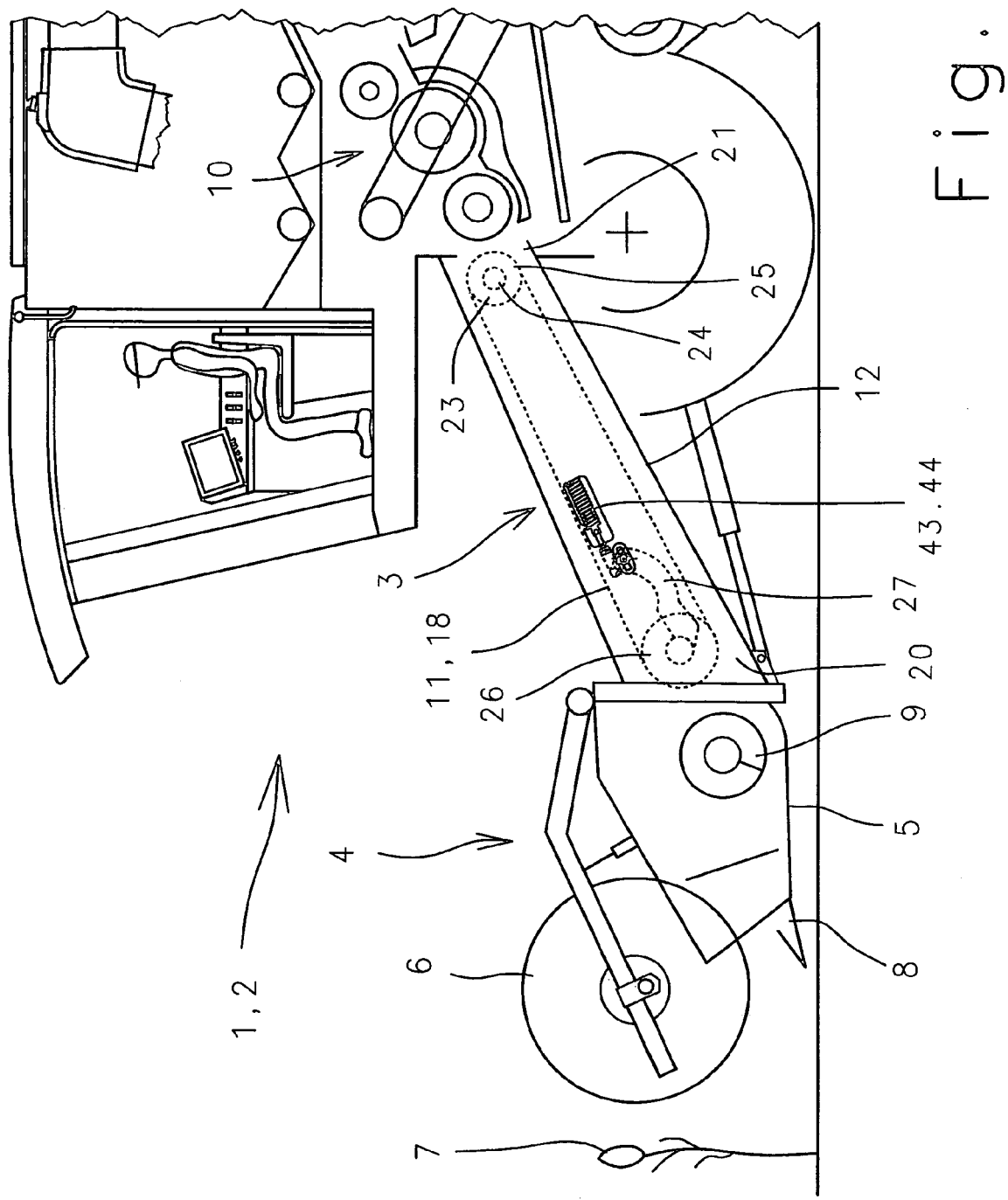
FIG. 1 shows a side view of a self-propelled combine harvester.

An agricultural harvesting machine 2 configured as a self-propelled combine harvester 1 is shown in a side view in FIG. 1, on the inclined conveyor 3 of which a cutting mechanism 4 is located. Cutting mechanism 4 is composed of a cutting table 5 and a rotating reel 6 assigned to this cutting mechanism on the top. Crops 7 are cut by a cutter bar 8 installed in the front region of cutting table 5 and transferred to inclined conveyor 3 according to the present invention and located behind it using a feed screw 9 located in cutting table 5. Crops 7 are grasped by a pulling means 11—which rotates in a counterclockwise direction—of inclined conveyor 3 and are conveyed further in an undershot manner over a bottom 12 of inclined conveyor 3 to a threshing device 10 that mechanically processes crops 7. A drive shaft 24 driven in a rotating manner in a counterclockwise direction is rotatably supported in outlet region 21 of inclined conveyor 3, on which said drive shaft chain wheels 25 are mounted in a rotation-proof manner.

Figure 2:
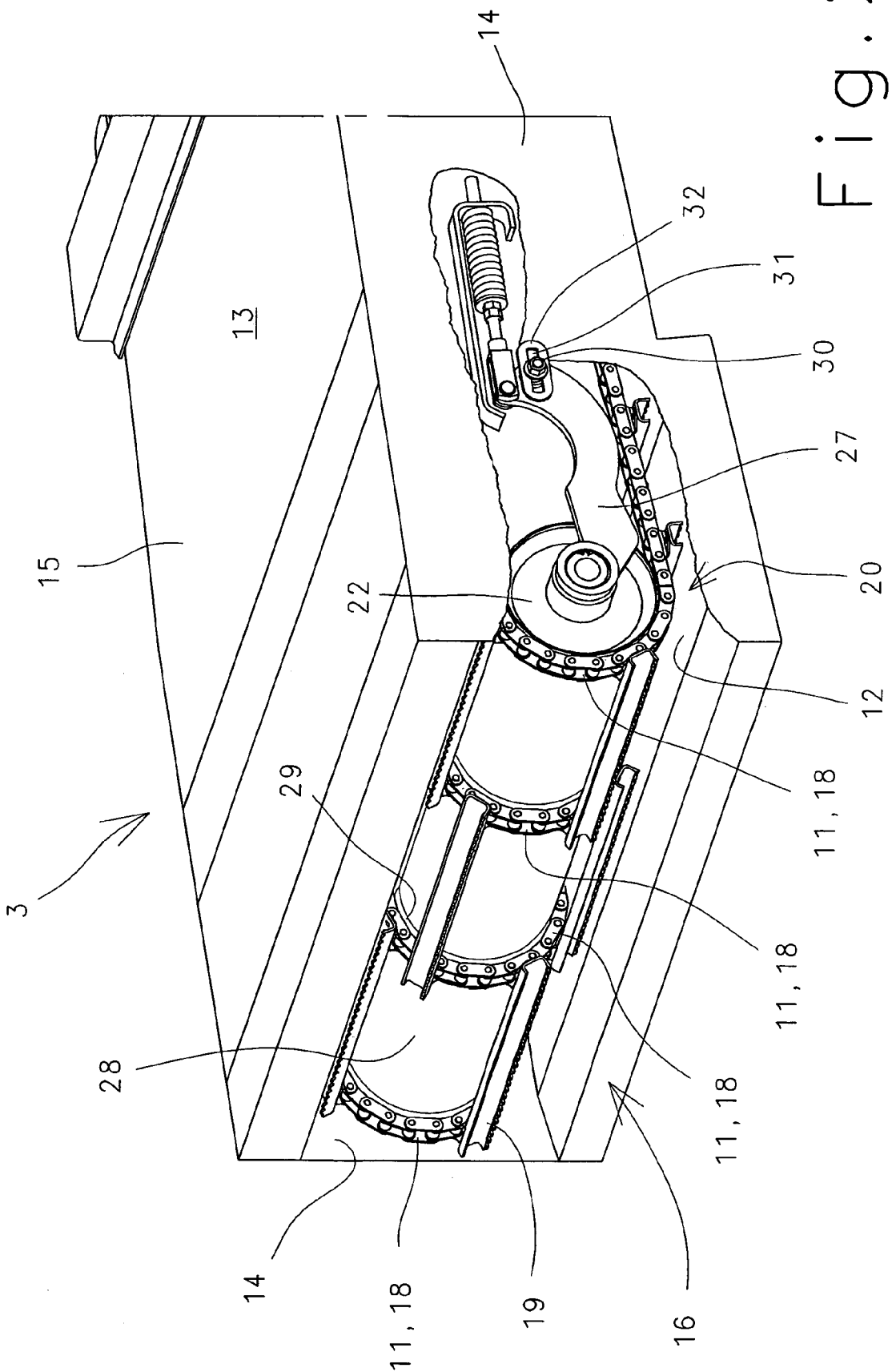
FIG. 2 shows a perspective view of the inclined conveyor according to the present invention.

FIG. 2 shows a perspective view of inclined conveyor 3 according to the present invention, rotating pulling means 11 of which are enclosed in a housing 13, whereby housing 13 is essentially composed of two side walls 14 and a cover 15 and bottom 12. Conveyor 16, formed by pulling means 11, is located inside housing 13, said pulling means 11 including a plurality of conveyor chains 18 located in parallel with and equidistant from each other, whereby adjacent conveyor chains 18 are joined via conveyor strips 19. Conveyor chains 18 of traction device 11 are redirected in an inlet region 20 of housing 13 with a first pulling-means guide 22, and in an outlet region 21 of housing 13 with a further pulling-means guide 23. Instead of conveyor chains 18, a belt or a rope can be used, for example. Pulling-means guide 22 located in outlet region 21 of the housing is composed of drive shaft 24 supported in side walls 14.

Each conveyor chain 18 of traction device 11 encircles a chain wheel (see FIG. 1) and engages in the teeth of the chain wheel, resulting in a form-fit functional connection. Pulling-means guide 23 located in inlet region 20 of housing 13 is composed of a return shaft 26 and two pivoting swing arms 27 configured as mirror images and rotatably supported on the two outer ends of return shaft 26. Return shaft 26 includes a drum 28, on the jacket of which flanges 29 are located with distance between them.

Conveyor chains 18 of pulling means 11 rest on flanges 29 and encircle them. A guide bolt 30 is welded on each of the swing arms 27, said guide bolt being guided in a slot 31 in side wall 14 located next to each swing arm 27. Both side walls 14 are reinforced by reinforcing sheets 32 in the edge region of slots 31. Both swing arms 27 are rotatably connected with a tensioning device 35 according to the present invention and to be described in greater detail at pivot points 34 located above guide bolts 30 at distances 33 from guide bolts 30. An opening 36 is provided in side walls 14 in the region of the tensioning devices 35, through which said opening tensioning devices 35 located in the interior of housing 13 are adjustable.

Figure 3:
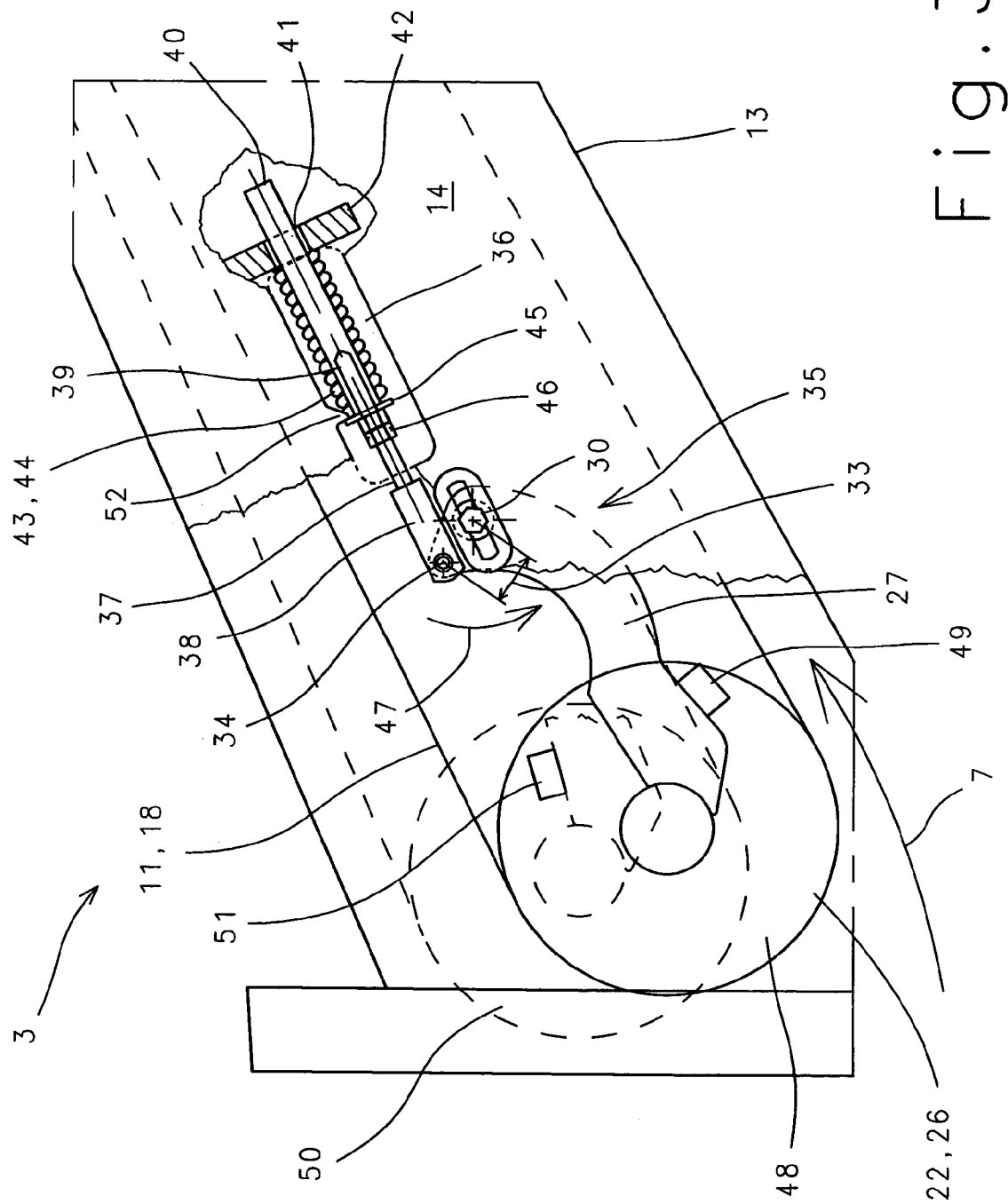
FIG. 3 shows a section of the side view of an inclined conveyor according to the present invention.

An enlarged section of the side view of inclined conveyor 3 with a pulling-means guide 22 and a tensioning device 35 according to the present invention is shown in FIG. 3. The description below applies accordingly for the components of inclined conveyor 3, which are configured either identically or as mirror images and are located further back and are therefore not visible. Tensioning device 35 is composed of a threaded rod 37 that is hingedly connected on one end via a yoke section 38 with swing arm 27 of pulling-means guide 22 and, at the other end, is screwed into a threaded blind hole 39 of a guide bolt 40. Guide bolt 40 is supported in a displaceable and rotatable manner in a through hole 41 of a web plate 42 that is welded to the inside of side wall 14. Guide bolt 40 passes through a compression spring 44 configured as coil spring 43, whereby a collar 45 located on guide bolt 40 preloads compression spring 44 against web plate 42. To secure guide bolt 40 from being screwed down by threaded rod 37, threaded rod 37 and guide bolt 40 are braced against each other with a lock nut 46.

Tensioning device 35 according to the present invention generates a return torque 47 around guide bolt 30 with the spring force of preloaded compression spring 44, in addition to the pulling means tensioning force. Return torque 47 acts on swing arm 27 and presses swing arm 27 in a lower position 48 against lower stop 49. Stop 49 located on the inside of side part 14 is rotatable from the outside, by way of which lower position 48 of return shaft 26 is adjustable.

Crops 7, which are pressing against return shaft 26, rotate swing arm 27 in the clockwise direction around guide bolt 30 into an upper position 50, by way of which guide bolt 40 is moved within through hole 41 guiding it into a rear region of web plate 42 on which tensioning device 35 is mounted. This results in compression spring 44 being compressed further, and return torque 47 produced by tensioning device 35 around guide bolt 30 increases as the spring force increases. Return torque 47 acting on swing arm 27 presses return shaft 26 against harvested crops 7. The strength of return torque 47 depends on the spring force of compression spring 44, which is proportional to the spring path of compression spring 44, and on distance 33 between pivot point 34 and guide bolt 30 of swing arm 27.

An upper stop 51 is rigidly mounted above swing arm 27 on the inside of side wall 14 of housing 13, the stop limiting the swivel range of swing arm 27 in the upward direction.

To always act upon pulling means 11 with the optimum tension, a marking 52 is provided on opening 36 provided in side wall 14, the marking indicating the length to which compression spring 44 should be preloaded. During on-going operation, conveyor chains 18 of pulling means 17 elongate due to wear, by way of which pulling-means guide 22 along with tensioning device 35 travels into an anterior region of inclined conveyor 3. Compression spring 44 relaxes, since the distance between collar 45 of guide bolt 40 and web plate 42 increases simultaneously. To restore the optimum preload of compression spring 44, guide bolt 40 is screwed down by threaded rod 37 to the point where collar 45 is again located at the level of marking 52.

It is within the ability of one skilled in the art to modify the exemplary embodiment described in a manner not shown, or to use it in other machine systems to obtain the effects described, without leaving the scope of the present invention.

It will be understood that each of the elements described above, or two or more together, may also find a useful application in other types of constructions differing from the types described above.

While the invention has been illustrated and described as embodied in an inclined conveyor of an agricultural harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An inclined conveyor of an agricultural harvesting machine, comprising at least one endless pulling means; at least one pulling-means guide operative for redirecting said at least one endless pulling means and being pivotable; a single tensioning device which is configured both for tensioning said at least one pulling means and for generating a return torque that acts on said at least one pulling-means guide, so that said single tensioning device both tensions said pulling means and presses said pulling means against a harvested crop; and a housing with side walls, and a swing arm with a guide bolt that is guided in a slot in one of said side walls.

2. An inclined conveyor as defined in claim 1, wherein said swing arm is rotatably connected with said tensioning device at a pivot point located above said guide bolt at a distance from said guide bolt.

3. An inclined conveyor of an agricultural harvesting machine, comprising at least one endless pulling means; at least one pulling-means guide operative for redirecting said at least one endless pulling means and being pivotable; a single tensioning device which is configured both for tensioning said at least one pulling means and for generating a return torque that acts on said at least one pulling-means guide so that said single tensioning device both tensions said pulling means and presses said pulling means against a harvested crop; and a return shaft, and a swing arm provided with a lower stop which is adjustable from outside, so that a lower position of said return shaft is adjustable.

4. An inclined conveyor of an agricultural harvesting machine, comprising at least one endless pulling means; at least one pulling-means guide operative for redirecting said at least one endless pulling means and being pivotable; a single tensioning device which is configured both for tensioning said at least one pulling means and for generating a return torque that acts on said at least one pulling-means guide, so that said single tensioning device both tensions said pulling means and presses said pulling means against a harvested crop, a housing having side walls, at least one of said side walls having an opening provided in a region of said tensioning device and configured so as to adjust said tensioning device; and a compression spring, and a marking located on said opening and indicating a length to which said compression spring should be preloaded.

5. An inclined conveyor of an agricultural harvesting machine, comprising at least one endless pulling means for grasping a harvested crop and moving in a crop conveying direction; at least one pulling-means guide operative for redirecting said at least one endless pulling means and being pivotable; a single tensioning device which is configured both for tensioning said at least one pulling means substantially in the crop conveying direction and for generating a return torque that acts on said at least one pivotable pulling-means guide which redirects said at least one endless pulling means, in a direction which is substantially transverse to the crop conveying direction, so that said single tensioning device both tensions said pulling means substantially in the crop conveying direction and presses said pulling means against a harvested crop in the direction which is substantially transverse to the crop conveying direction to thereby compress a stream of the harvested crop and to reliably convey it to a rear region of the inclined conveyor.

6. An inclined conveyor as defined in claim 5, wherein said at least one pulling-means guide includes a return shaft and at least one swing arm, said swing arm being pivotally supported.

7. An inclined conveyor as defined in claim 5; and further comprising a lower stop, said tensioning device being configured so that the return torque generated by said tensioning device presses said pulling-means guide in a lower position.

8. An inclined conveyor as defined in claim 5; and further comprising a return shaft, said tensioning device being configured so that the return torque generated by said tensioning device presses said pulling-means guide in an upper position against crops and lifts said return shaft.

9. An inclined conveyor as defined in claim 5; and further comprising a swing arm, said tensioning device being configured so that the return torque generated by said tensioning device increases as a vertical orientation of said swing arm increases.

10. An inclined conveyor as defined in claim 5; and further comprising a housing, said tensioning device being located at least partially in an interior of said housing.

11. An inclined conveyor as defined in claim 5; and further comprising a housing having side walls, at least one of said side walls having an opening provided in a region of said tensioning device and configured so as to adjust said tensioning device.

12. An inclined conveyor as defined in claim 5; and further comprising a swing arm, and at least one upper stop which limits a movement of said swing arm.

* * * * *